US012286294B2

(12) United States Patent
Austrheim

(10) Patent No.: US 12,286,294 B2
(45) Date of Patent: Apr. 29, 2025

(54) EXPANSION JOINT, SYSTEM AND METHOD FOR CONNECTING REGIONS OF A RAIL-BASED GRID STORAGE SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 913 days.

(21) Appl. No.: 17/280,922

(22) PCT Filed: Sep. 25, 2019

(86) PCT No.: PCT/EP2019/075792
§ 371 (c)(1),
(2) Date: Mar. 29, 2021

(87) PCT Pub. No.: WO2020/074257
PCT Pub. Date: Apr. 16, 2020

(65) Prior Publication Data
US 2021/0339950 A1     Nov. 4, 2021

(30) Foreign Application Priority Data

Oct. 9, 2018   (NO) ................................... 20181296

(51) Int. Cl.
*B65G 1/04*   (2006.01)
*B65G 1/06*   (2006.01)
(Continued)

(52) U.S. Cl.
CPC .......... *B65G 1/0464* (2013.01); *B65G 1/065* (2013.01); *B65G 21/00* (2013.01); *E01D 19/06* (2013.01)

(58) Field of Classification Search
CPC ...... E01D 19/06; B65G 21/00; B65G 1/0464; B65G 1/065; E01B 11/42
See application file for complete search history.

(56) References Cited

U.S. PATENT DOCUMENTS 3,528,608 A     9/1970   Janzow et al.
4,485,967 A  *  12/1984  Edwards .................. E01B 11/32
                                                     238/226
(Continued)

FOREIGN PATENT DOCUMENTS

CN     1269440 209440 A    10/2000
CN        102465470 A       5/2012
(Continued)

OTHER PUBLICATIONS

Written Opinion for corresponding International Application No. PCT/EP2019/075792, mailed Jan. 13, 2020 (8 pages).
(Continued)

*Primary Examiner* — Zachary L Kuhfuss
*Assistant Examiner* — Heaven R Buffington
(74) *Attorney, Agent, or Firm* — Baker Botts L.L.P.

(57) ABSTRACT

The invention relates to an expansion joint (10) for connecting regions of a rail-based grid storage system (50, 50', 50"; 104, 104', 104"), the expansion joint (10) comprising: —a first rail element (12) and a second rail element (11), the rail elements (12, 11) being elongate and configured to slide relative to one another in a longitudinal direction in a junction area where they overlap, —the expansion joint (10) having a profiled upper surface that defines one or more tracks (27', 27") for supporting container handling vehicles (200, 300, 400), the tracks (27', 27") extending from the first rail element (12) through the junction area to the second rail element (11), wherein in the junction area, each rail element (11, 12) provides a portion of the or each track (27', 27") of the profiled upper surface so that there is a transition
(Continued)

extending along the expansion joint (10) from the first rail element (12) to the second rail element (10) for the or each track (27', 27"). The invention further relates to an automated storage and retrieval system comprising said expansion joint (10) and a method of connecting regions (50, 50', 50"; 104, 104', 104") of a rail-based grid storage system and/or delivery rail system using one or more of the expansion joints (10)

13 Claims, 16 Drawing Sheets

(51) Int. Cl.
*B65G 21/00* (2006.01)
*E01D 19/06* (2006.01)

(56) References Cited

U.S. PATENT DOCUMENTS

| | | | | |
|---|---|---|---|---|
| 5,421,051 | A | * | 6/1995 | Patten ............... E01D 15/06 14/43 |
| 6,409,011 | B1 | * | 6/2002 | Ferguson ............ B65G 15/00 186/68 |
| 10,822,166 | B2 | * | 11/2020 | Ingram-Tedd ....... B65G 1/0464 |
| 2002/0054785 | A1 | * | 5/2002 | Betts ............... E01D 19/065 403/122 |
| 2008/0006510 | A1 | * | 1/2008 | Freudelsperger ........ B65G 1/00 198/593 |
| 2010/0096468 | A1 | | 4/2010 | Igwemezie |
| 2014/0034744 | A1 | | 2/2014 | Hayden |

FOREIGN PATENT DOCUMENTS

| | | | | |
|---|---|---|---|---|
| CN | 102465479 | A | * | 5/2012 ............... B61F 9/00 |
| CN | 202830654 | U | | 3/2013 |
| CN | 104631227 | A | | 5/2015 |
| CN | 107922115 | A | | 4/2018 |
| DE | 29720452 | U1 | | 2/1998 |
| DE | 10 2008 031153 | A1 | | 2/2009 |
| ES | 2569454 | A1 | * | 5/2016 ............. E01B 11/06 |
| GB | 1 247 878 | A | | 9/1971 |
| JP | S4216785 | Y | | 9/1967 |
| JP | S44-11286 | Y1 | | 5/1969 |
| JP | 6383986 | U | | 6/1988 |
| JP | 2004084259 | A | | 3/2004 |
| JP | 2012106814 | A | | 6/2012 |
| JP | 2017-524625 | A | | 8/2017 |
| JP | 2018-520965 | A | | 8/2018 |
| NO | 317366 | B1 | | 10/2004 |
| WO | 2014/075937 | A1 | | 5/2014 |
| WO | 2014/090684 | A1 | | 6/2014 |
| WO | 2015/193278 | A1 | | 12/2015 |
| WO | 2016166294 | A1 | | 10/2016 |
| WO | 2016/198467 | A1 | | 12/2016 |
| WO | 2018049441 | A1 | | 3/2018 |
| WO | 2018/146304 | A1 | | 8/2018 |

OTHER PUBLICATIONS

International Search Report for corresponding International Application No. PCT/EP2019/075792, mailed Jan. 13, 2020 (4 pages).
Notification Concerning Submission, Obtention or Transmittal of Priority Document for corresponding International Application No. PCT/EP2019/075792, mailed Oct. 11, 2019 (1 pages).
Office Action issued in counterpart Japanese Patent Application No. 2021-519560 mailed on Aug. 30, 2023 (10 pages).
Office Action issued in Chinese Application No. 2019800665167 mailed on Feb. 25, 2022 (21 pages).
Office Action issued in counterpart Chinese Patent Application No. 2022106486041 mailed on Mar. 29, 2024 (18 pages).

* cited by examiner

A

B

EXPANSION JOINT, SYSTEM AND METHOD FOR CONNECTING REGIONS OF A RAIL-BASED GRID STORAGE SYSTEM

The present invention relates to an expansion joint for connecting a first set of rails and a second set of rails, such as rails in an automated storage and retrieval system, as well as an associated system and method utilizing such expansion joint(s).

BACKGROUND AND PRIOR ART

FIGS. 1A and 1C disclose a typical prior art automated storage and retrieval system 1 with a framework structure 100. FIGS. 1B and 1D disclose a prior art container handling vehicle 200, 300 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a container handling vehicle rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200, 300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single rail (also denoted single track) system, as is shown in FIG. 2A. Alternatively, the rail system 108 may be a double rail (also denoted double track) system, as is shown in FIG. 2B, thus allowing a container handling vehicle 201 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box. For example, the sections of the rail-based system being made of aluminium are the rails, and on the upper surface of the rails, there are a pair of tracks that the wheels of the vehicle run in. However, the sections could be separate rails each with a track.

Consequently, rails 110a and 110b form pairs of neighboring rails defining parallel rows of grid cells running in the X direction, and rails 111a and 111b form pairs of neighboring rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells 122 are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station (not shown), and the second delivery column 120 may comprise a dedicated pick-up port where the container handling vehicles 200,300 can pick up storage containers 106 that have been transported through the delivery column 120 from an access or a transfer station (not shown). Each of the ports of the first and second delivery column 119,120 may comprise a port suitable for both pick up and drop of storage containers 106.

The second location may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column 119,120 and the access station.

If the lower port of the delivery column 119,120 and the access station are located at different levels, the conveyor system may comprise a lift device for transporting the storage containers 106 vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, disclose an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

In situations where two rail systems are to be connected or constructed simultaneously for later connection, only minimal tolerances with respect to misalignment between the rail systems are possible. Significant misalignment can result in a vehicle becoming derailed.

Ambient temperatures or temperature differences within the building or area where the rail systems are arranged can also bring issues for the automated storage and retrieval system. The rails may expand and contract significantly, resulting in buckling or over tension in the rails, potentially giving rise to movement in the rails and ultimately risking that a container handling vehicle could derail. The problems of expansion and contraction will depend in part on the length of the rails. Thus, for rail systems of a significant length either in the X direction and/or in the Y direction, there is an increased risk of movement and with that buckling and/or excessive tension in the rail system.

In view of the above, it is desirable to provide an automated storage and retrieval system, and a method for operating such a system, that solve or at least mitigate one or more of the aforementioned problem related to use of prior art storage and retrieval systems.

Another objective is to provide a connection simplifying the connection of two rail systems.

Another objective is to provide a connection which solves, or at least mitigates, issues relating to expansion and/or contraction of rails, and in particular rails of significant length subject to large temperature differences with the risk of expansion and contraction as the result.

SUMMARY OF THE INVENTION

The invention is set forth in the independent claims and the dependent claims describe alternatives of the invention.

The invention relates to an expansion joint for connecting regions of a rail-based grid storage system, the expansion joint comprising:
- a first rail element and a second rail element, the rail elements being elongate and configured to slide relative to one another in a longitudinal direction in a junction area where they overlap,
- the expansion joint having a profiled upper surface that defines one or more tracks, the tracks extending from the first rail element through the junction area to the second rail element, wherein, in the junction area, each rail element provides a portion of the or each track of the profiled upper surface so that there is a transition extending along the expansion joint from the first rail element to the second rail element for the or each track.

The first rail element may comprise a protruding male part and the second rail element may comprise a receiving female part comprising a recess. Alternatively, the first rail element may comprise the recess and the second rail element may comprise the protruding male part.

The first and second rail elements of the expansion joint are arranged such that wheel(s) of the vehicles transfers weight from a first region to the second region via one of the first or second rail element to the other of the first or second rail element without experiencing a step in the track when passing the expansion joint.

In other words, the parts of the first and second rail elements that are arranged side-by-side each other in the transition form part of a continuous drive track(s) in the junction area where they overlap.

The junction area may define a dividing line between the first rail element and the second rail element that runs along a centre of the or each track where the first and second rail elements overlap, i.e. in the area where the first and second rail elements are arranged side-by-side/lateral relative each other.

When the first and second rail elements overlap (i.e. arranged side-by-side), the combined total width of the first and second rail elements are equal to the width of the each track.

The expansion joint may comprise a first and a second track, and the portions of the tracks may each form dividing lines running along a centre of the first and second track, respectively.

The expansion joint may further comprise a guide arrangement provided below the one or more tracks to support ends of the first and second rail elements and guide relative longitudinal movement thereof as the portions of the one or more tracks slide relative to each other in the junction area. The guide arrangement may comprise one or more of the following: an intermediate connection element, a slide connection, a roller-based connection, a link, a recess in second rail element, a recess in intermediate connection element or link.

If the guide arrangement comprises a roller-based connection, the roller-based connection may be arranged to prevent movement in a direction perpendicular to the longitudinal direction.

If the guide arrangement comprises a link, the link may be connected to the first rail element via a pivot connection arrangement and may be able to span a gap between the first and second rail elements. The pivot connection arrangement may allow the link to be pivoted between a non-connected position where the first and second rail elements of the expansion joint are not connected together and a connected position where the first and second rail elements of the expansion joint are connected together by the link.

It is further described an automatic storage and retrieval system comprising first and second regions of a rail-based grid storage system and/or a delivery rail system, wherein the system comprises one or more expansion joints as described above and each of the first and second regions have rails with a profiled upper surface that define one or more tracks of the same gauge and profile as the one or more tracks in the expansion joint(s), the expansion joints being arranged as one or more connections between the first and second regions.

The first and second regions may be two regions of a rail-based grid storage system or two regions of a delivery rail system, i.e. the regions can be first and second rail systems of a rail-based grid storage system or the regions may be first and second rail systems of a delivery rail system.

The first and second regions of a rail-based grid storage system and/or a delivery rail system may comprise a grid arrangement of rails defining a plurality of grid cells.

The expansion joint can be arranged such that track(s) in the first set of rails overlap with track(s) in the expansion joint which again overlap with track(s) in the second set of rails, thereby forming a continuous track in the longitudinal direction, while at the same time allowing sliding movement of the first rail system relative the second rail system, and providing a smooth transition across the junction. For example, the expansion joint(s) are arranged so that there is no continuous slot extending laterally across the track that can pull apart—instead, the track is formed by two portions that overlap so that the wheel of the vehicle transfers weight from one to the other without experiencing a step in the track.

From a middle position of the expansion joint, it may preferably allow e.g. ±40 mm movement in the longitudinal direction. However, the allowed movement in the longitudinal direction can be more or it can be less.

It is further described a method of connecting regions of a rail-based grid storage system and/or delivery rail system using one or more expansion joints as described above, each of the regions having rails with a profiled upper surface that defines one or more tracks of the same gauge and profile as the one or more tracks in the expansion joints, wherein the method comprises the steps of:

arranging the regions with a predetermined separation,
connecting the regions together using one or more of the expansion joints, thereby forming a continuous network of rails linking one end of a first region via the expansion joint, to an opposite end of a second region.

The method may further comprise, before connecting the first and second regions, a step of:

levelling the first and second regions such that the profiled upper surfaces of the first and second regions are on the same elevation.

The first and second regions connected by the method may be regions of a rail-based storage grid system or a delivery rail system.

The expansion joint can be used in any rail-based systems, both grid storage systems and delivery rail systems.

The expansion joint can be used in a connection between two grid systems with rails in X direction or in Y direction.

It is also possible that the connection is between one grid system with rails in X and Y direction and one rail system comprising a single/double rail.

When connecting two regions of rail-based storage systems and/or delivery rail systems, the respective first rail part and second rail part to be connected can finish approximately midway across a cell. When connected, the cell where the expansion joint is arranged can be almost of a similar size as a standard cell, or it can be longer or it can be shorter. Vehicles can typically pass such cells in one direction, i.e. the direction of the expansion joint, because the distance between tracks for the wheels of the vehicles in the opposite direction may vary. The distance between the wheels are fixed. Furthermore, due to the varying distance between the tracks, the row where the expansion joint is arranged may not be used for storing storage containers.

BRIEF DESCRIPTION OF THE DRAWINGS

The following drawings depict exemplary embodiments of the present invention and are appended to facilitate the understanding of the invention.

FIG. 1A and FIG. 1C show the complete system and FIG. 1B and FIG. 1D show examples of system operable prior art container handling vehicles;

FIG. 2A shows a single rail/track system, FIG. 2B shows a double rail/track system and FIG. 2 C shows a double rail/track system and indicates width and length of a container handling vehicle grid cell;

FIG. 5B is a side view and FIG. 5C is a top side view;

DETAILED DESCRIPTION OF THE INVENTION

Figure 1:
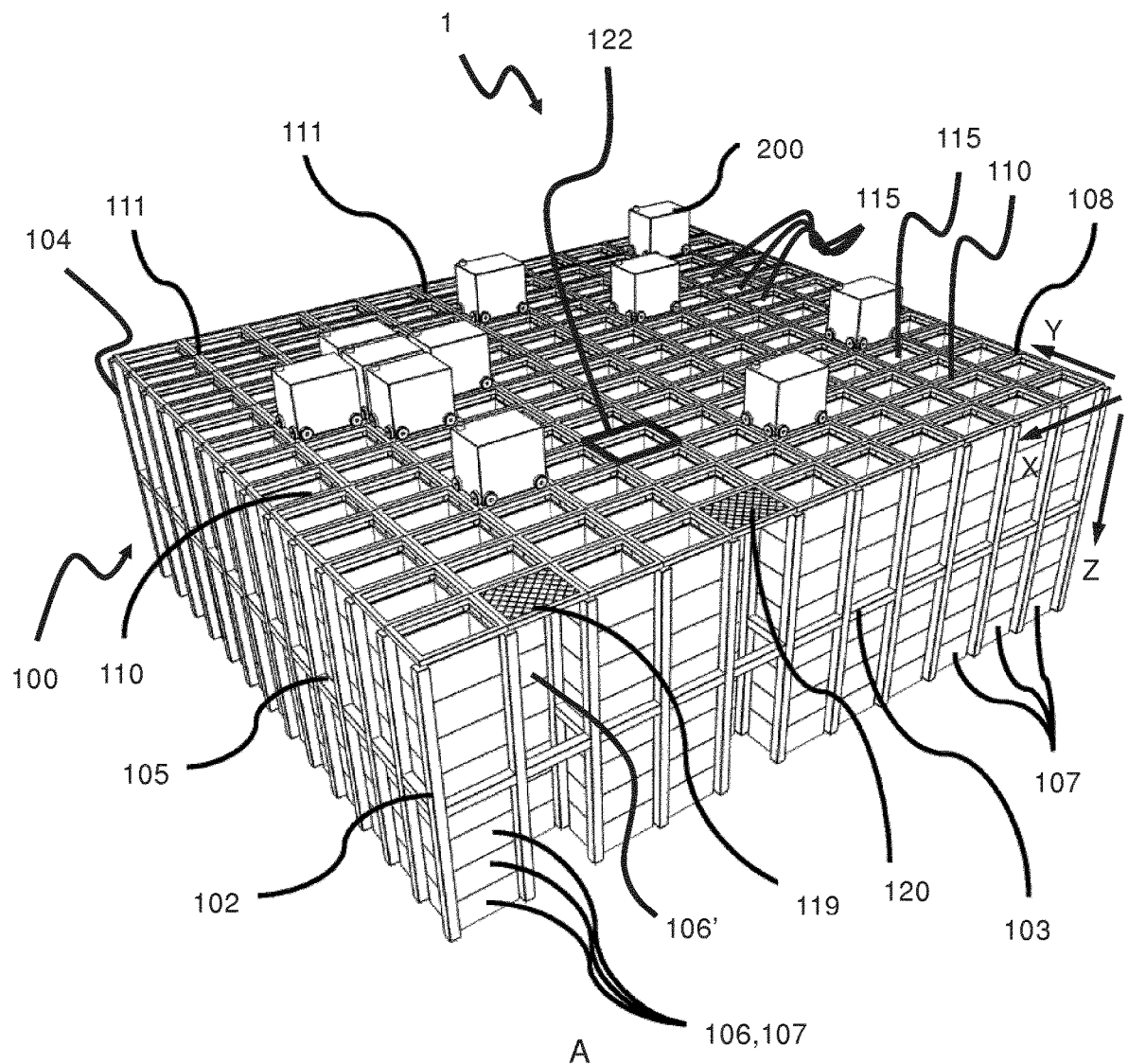
FIG. 1 A-D are perspectives view of a prior art automated storage and retrieval system, where
Figure 1:
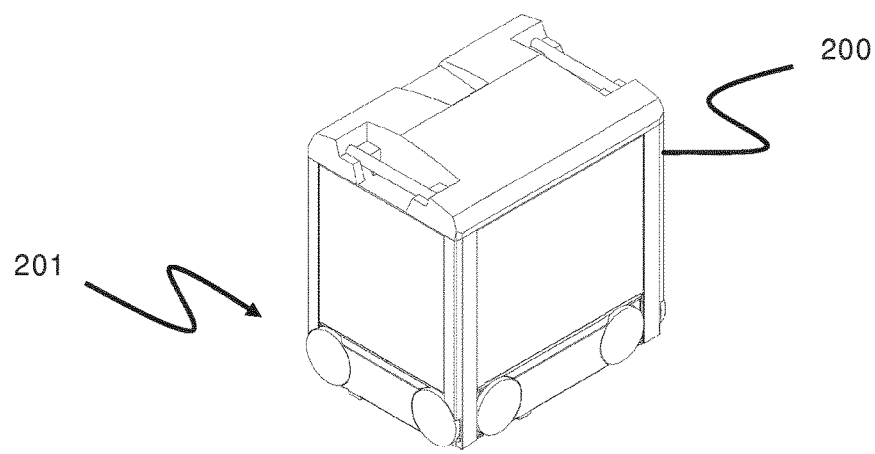
Figure 1:
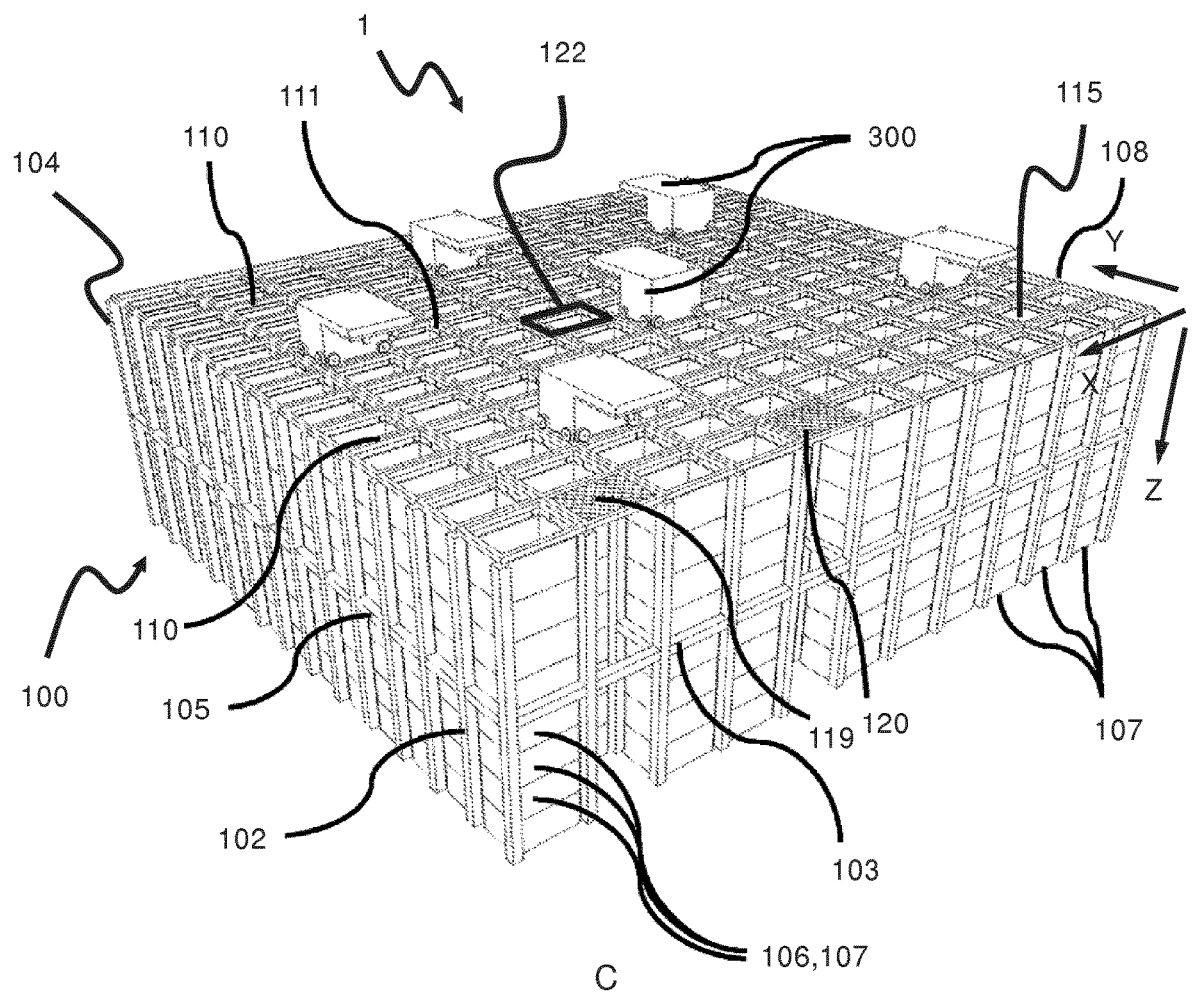
Figure 1:
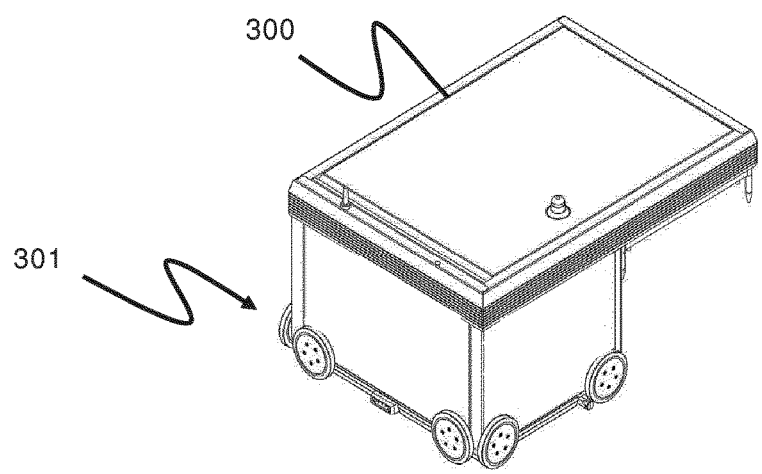
Figure 2:
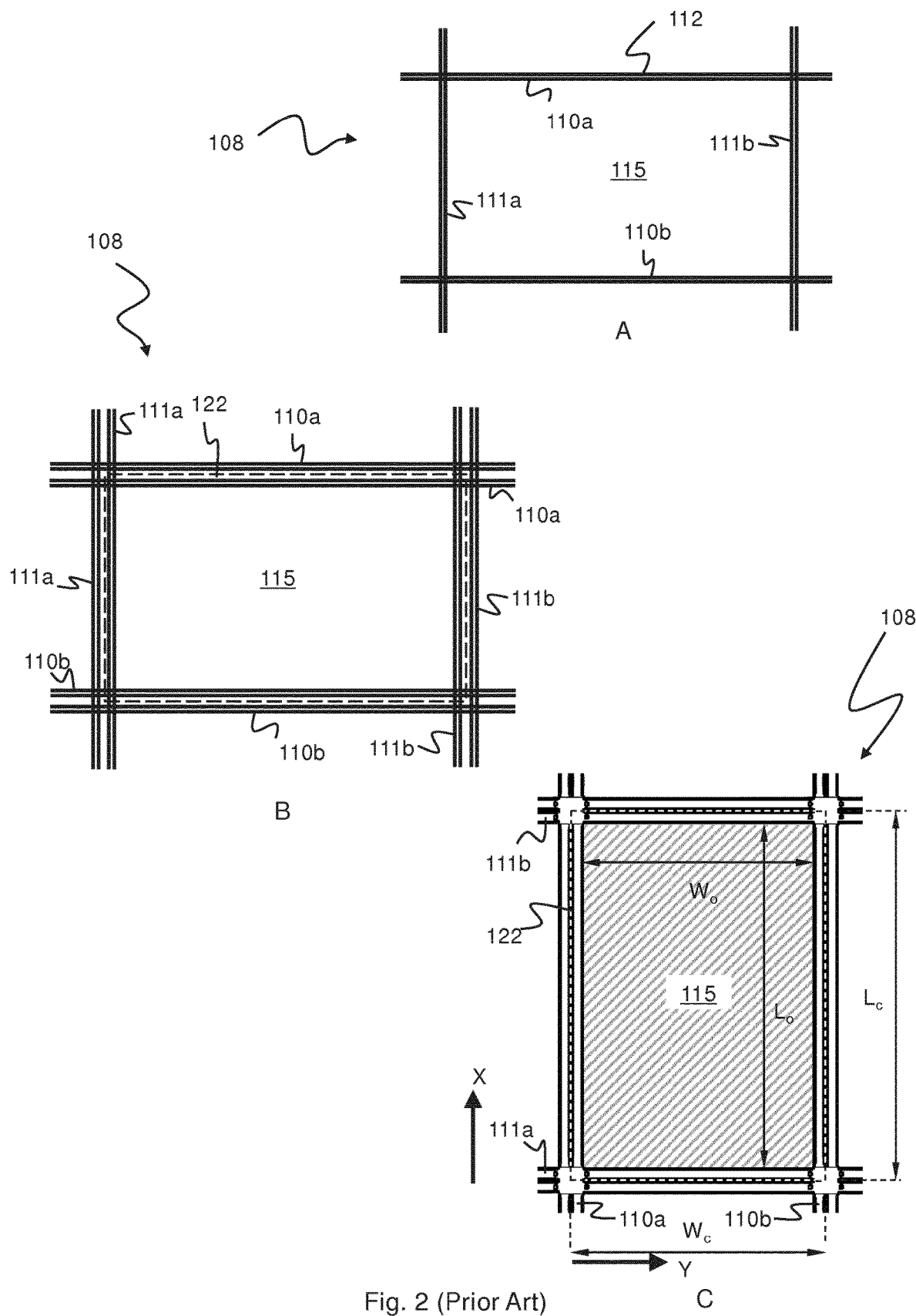
FIG. 2 A-C are top views of a container handling vehicle rail system, where

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the expansion joint or system only, it is apparent that they are valid for the method of connecting rail-based storage systems as well, and vice versa. Hence, any features described in relation to the method, are also valid for the expansion joint and the system.

Figure 3:
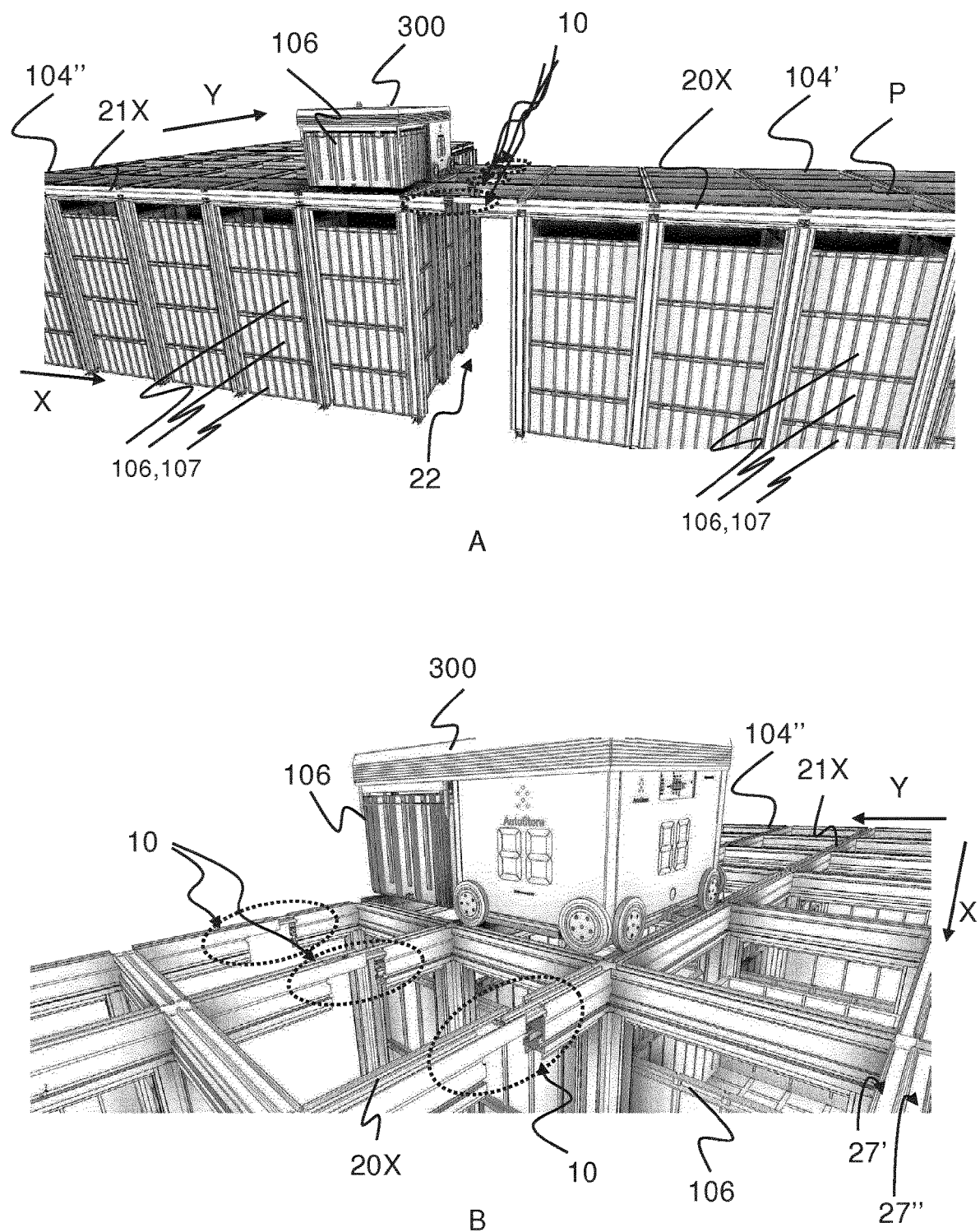
FIG. 3A is a side view of two regions which have been connected, exemplified as two storage grids, using an expansion joint, the expansion joint connecting rails in the X direction of the storage grids.
FIG. 3B is a top side close up view of the expansion joint in FIG. 3A.
FIG. 3C is a top view of an expansion joint and storage grids as disclosed in FIG. 3A.
FIG. 3D is a top side view of an expansion joint comprising a roller-based connection, the expansion joint connecting rails in the Y direction and is arranged on top of a storage grid.
FIG. 3E is an alternative top side view of FIG. 3D.
FIG. 3F is a side view of FIG. 3E.
Figure 3:
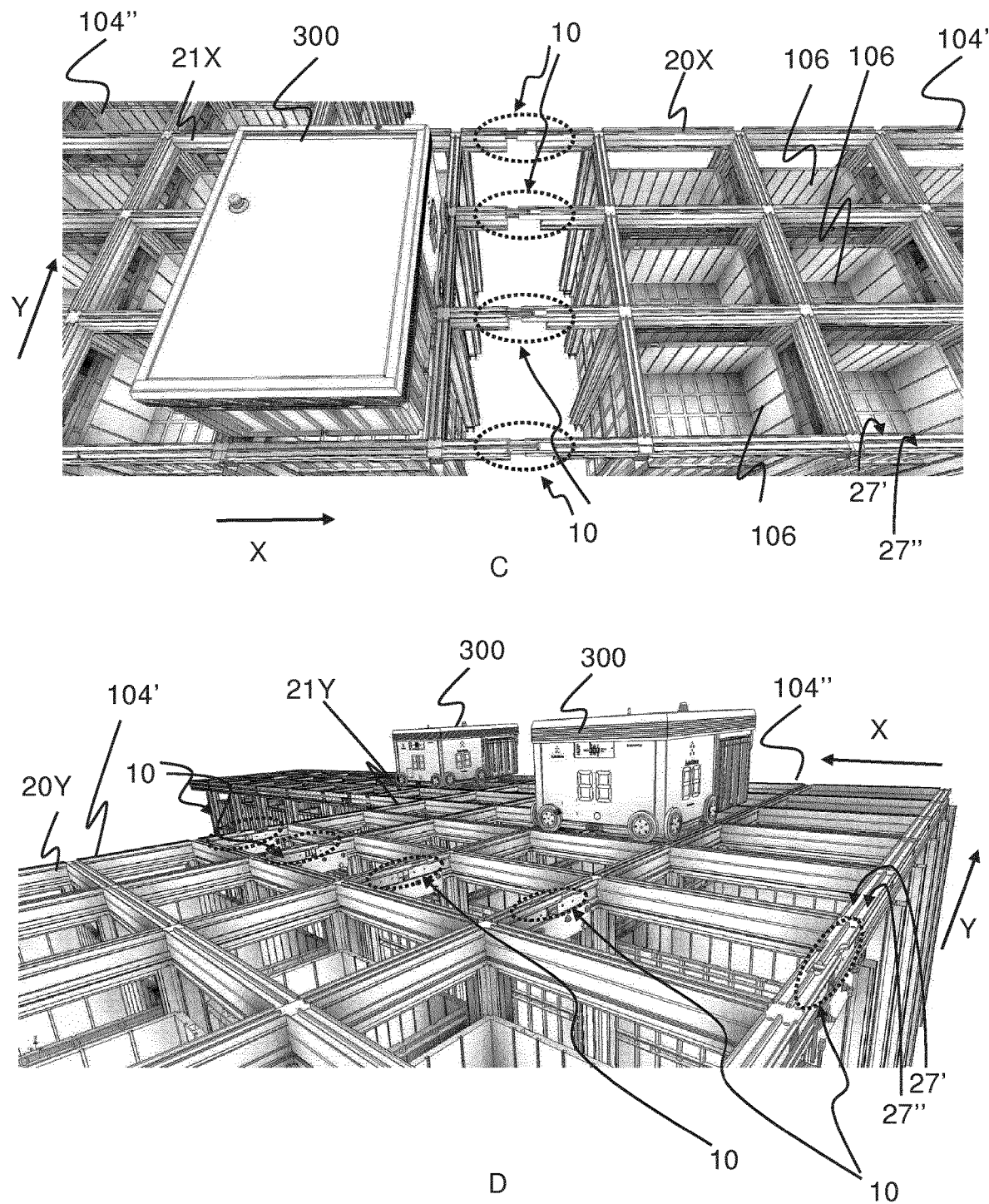
Figure 3:
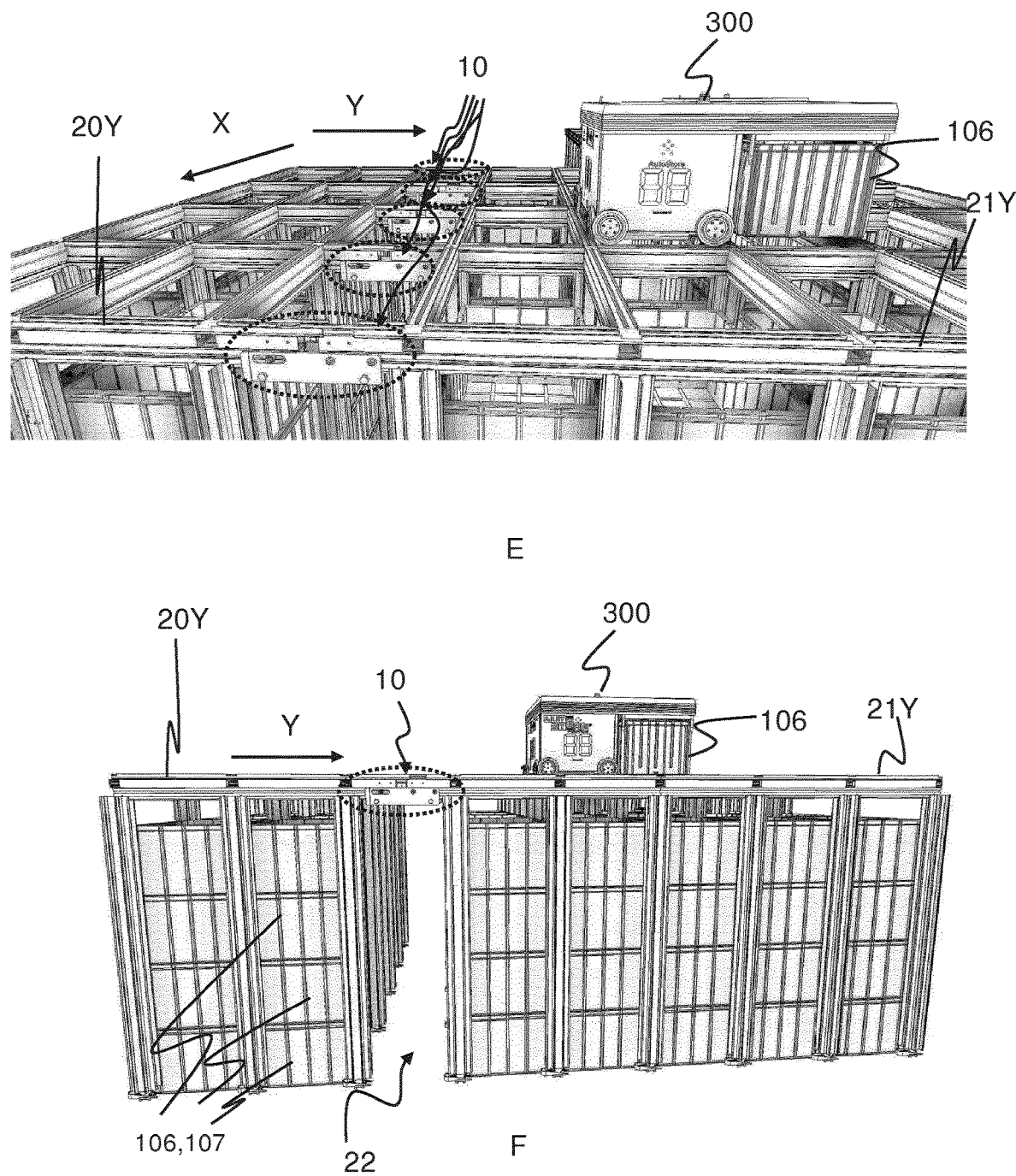

FIG. 3A is a side view of two storage grids 104', 104" which have been connected using an expansion joint 10. The expansion joint 10 in FIG. 3A connects rails extending in the X direction of the two storage grids 104', 104". The storage grids 104', 104" may be of equal size or have a different size, both with regards to horizontal extent of the grids 104', 104" and vertical extent of the grids 104', 104". The disclosed storage grids 104', 104" both have the capacity of storing stacks 107 of four storage containers 106. However, it is advantageous if the rails in the storage grids 104', 104" are flush with each other such that the container handling vehicles travelling between the storage grids 104', 104" can travel mainly within the same horizontal plane P independent of whether the container handling vehicle 300 is on storage grid with reference 104', storage grid with reference 104" or at the expansion joint 10 between the two storage grids 104', 104". I.e., in other words, when two regions of the storage grids 104', 104" are connected, they function as one common large grid. Similarly, and as described in greater detail with reference to e.g. FIGS. 4A-4E, FIGS. 5A-C and FIGS. 6A-C when two regions of delivery rail system 50, 50', 50" are connected, they function as one common large grid.

As indicated above, the two storage grids 104', 104" are, in FIG. 3A, connected in the X direction of the rails, where a first set of rails 20X in X direction on storage grid with reference 104' is connected to a second set of rails 21X in the X direction of storage grid with reference 104". A similar expansion joint 10 is arranged between all of the first set of rails 20X which have a corresponding second set of rails 21X along the same horizontal axis. In FIG. 3A there is a total of four expansion joints 10 connecting a total of four first set of rails 20X each with a dedicated second set of rails 21X. However, it is apparent that the number of expansion joints 10 and first and second sets of rails 20X, 21X may vary and that it can be more or it can be less.

Due to the change in the length of the expansion joint 10, the space 22, i.e. the row formed below the expansion joints 10, will normally not serve as a storage space for containers 106,107, and may instead be used as a passage or similar.

All rails extending in the X direction are identical, thus in all Figures reference to first set of rails 20X, 21X can be any of the individual rails (double rail/track system or single rail/track system) in the X direction.

Similarly, all rails extending in the Y direction are identical, thus in the Figures reference to first set of rails 20Y, 21Y can be any of the individual rails (double rail/track system or single rail/track system) in the Y direction.

FIG. 3B is a top side close up view of three of the expansion joints 10 between the first set of rails 20X in the X direction and the second set of rails 21X in the X direction of FIG. 3A. In FIG. 3B, the storage grids 104', 104", expansion joints 10 and container handling vehicle 300 are seen from the opposite side compared to FIG. 3A. The container handling vehicle 300 is disclosed carrying a storage container 106.

FIG. 3C is a top view of the four expansion joints 10 connecting the first set of rails 20X and the second set of rails 21X in FIG. 3A.

FIG. 3D is a top side view of an expansion joint comprising a roller-based connection, the expansion joints 10 connecting first sets of rails 20Y in the Y direction of storage grid with reference 104' and second sets of rails 21Y in the Y direction of storage grid with reference 104". The expansion joints 10 connects the rail systems of the respective storage grids 104', 104". The expansion joint 10 comprising a roller-based connection is the same irrespective of used in connecting rails extending in the X direction or in the Y direction. Details of the expansion joints 10 with roller-based connection are given below with reference to FIGS. 6A-6C.

FIG. 3E is an alternative top side view of FIG. 3D showing more details of the expansion joint 10 comprising a roller-based connection.

FIG. 3F is a side view of FIG. 3E.

Figure 4:
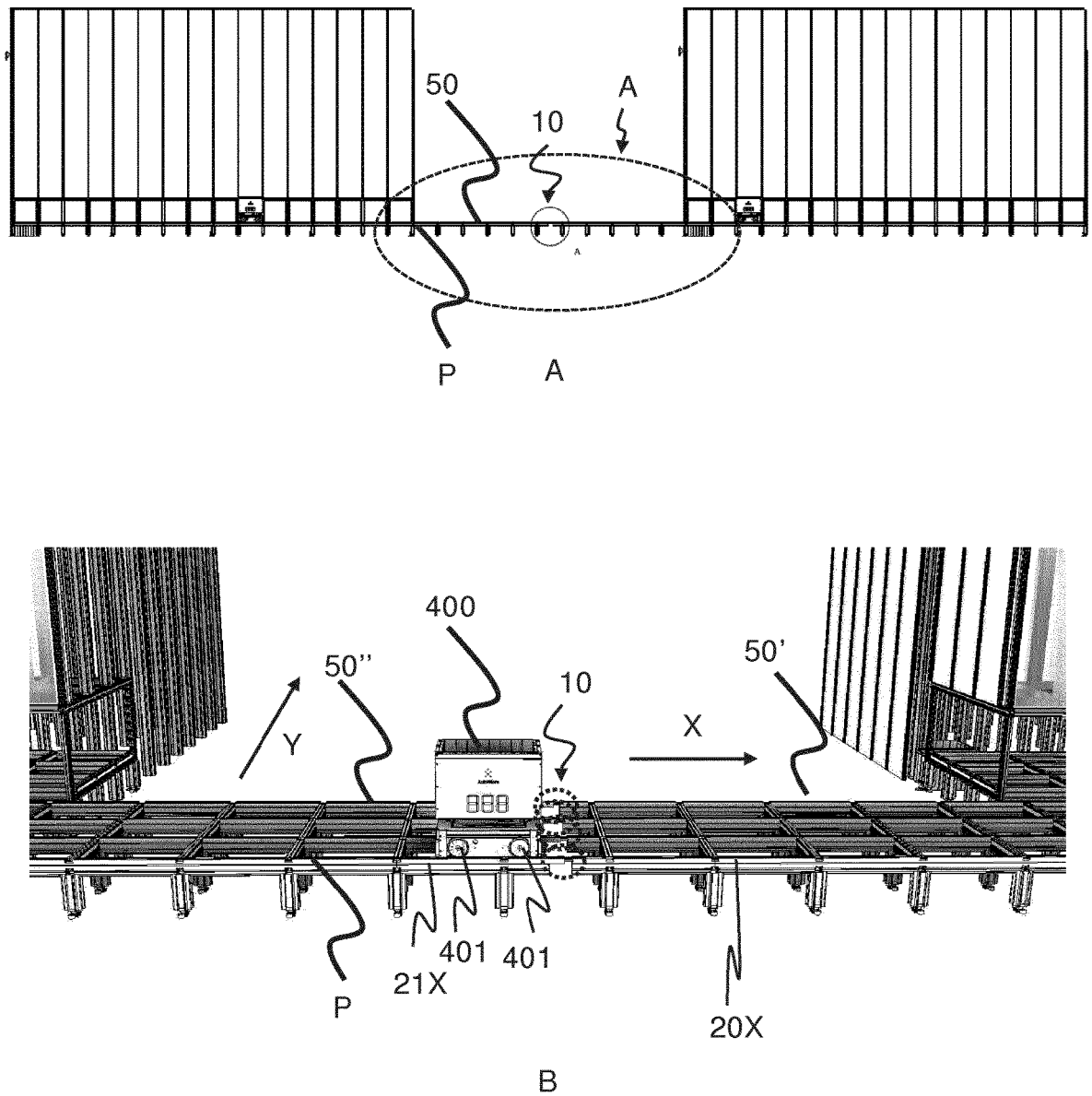
FIG. 4A is a side view of a rail system, such as a delivery rail system, arranged below two storage grids, the regions of the delivery rail system have been connected using an exemplary expansion joint according to the invention in an X direction of the rails in the rail systems, the expansion joint comprising a slide connection.
FIG. 4B is an enlarged view of section A in FIG. 4A showing a container handling vehicle on the delivery rail system.
FIG. 4C is an enlarged view of the delivery rail system of FIG. 4B.
FIG. 4D is a top side view of the expansion joint of FIG. 4C.
FIG. 4E is an exploded view of the expansion joint disclosed in FIGS. 4A-4D comprising a slide connection.
Figure 4:
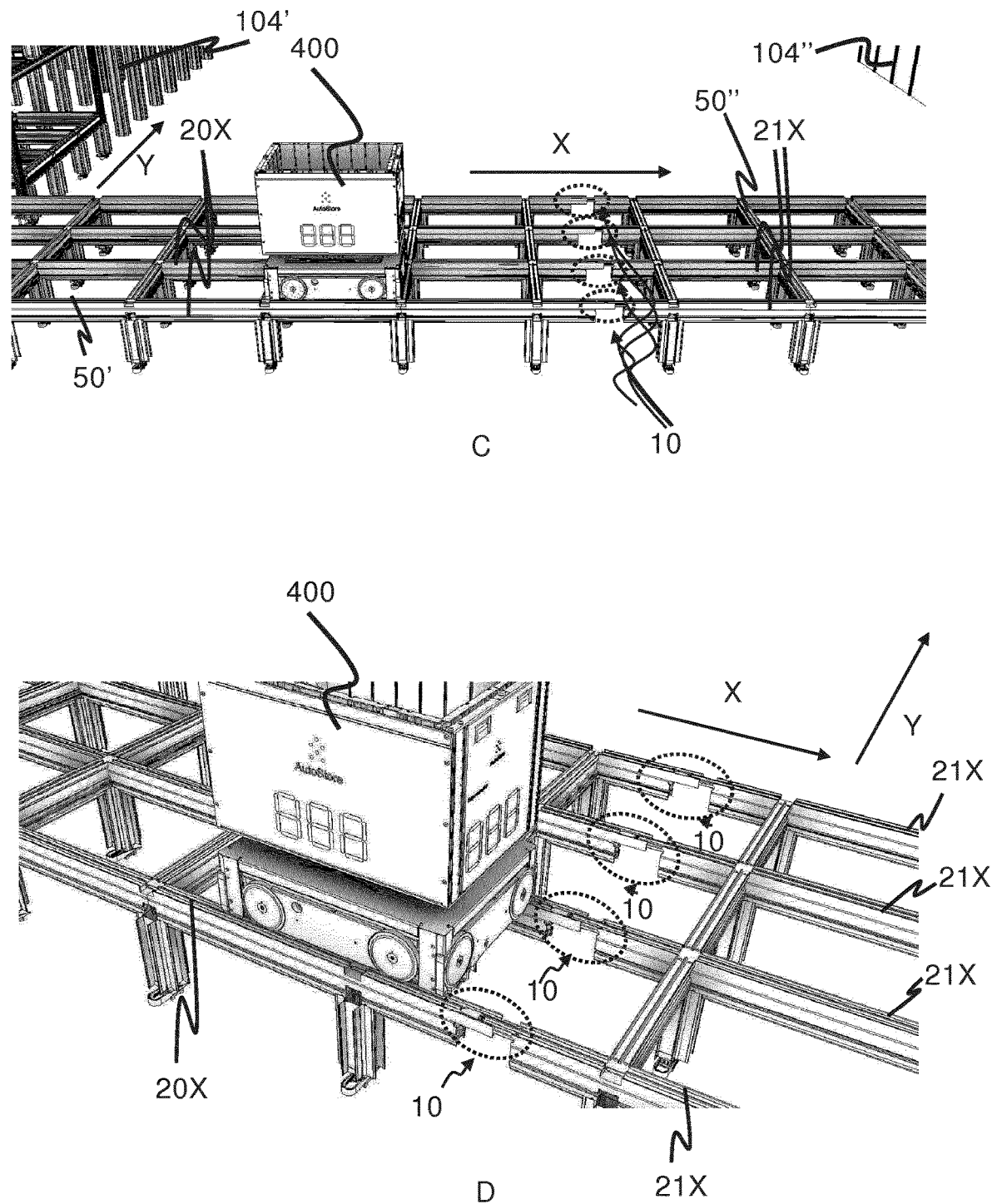
Figure 4:
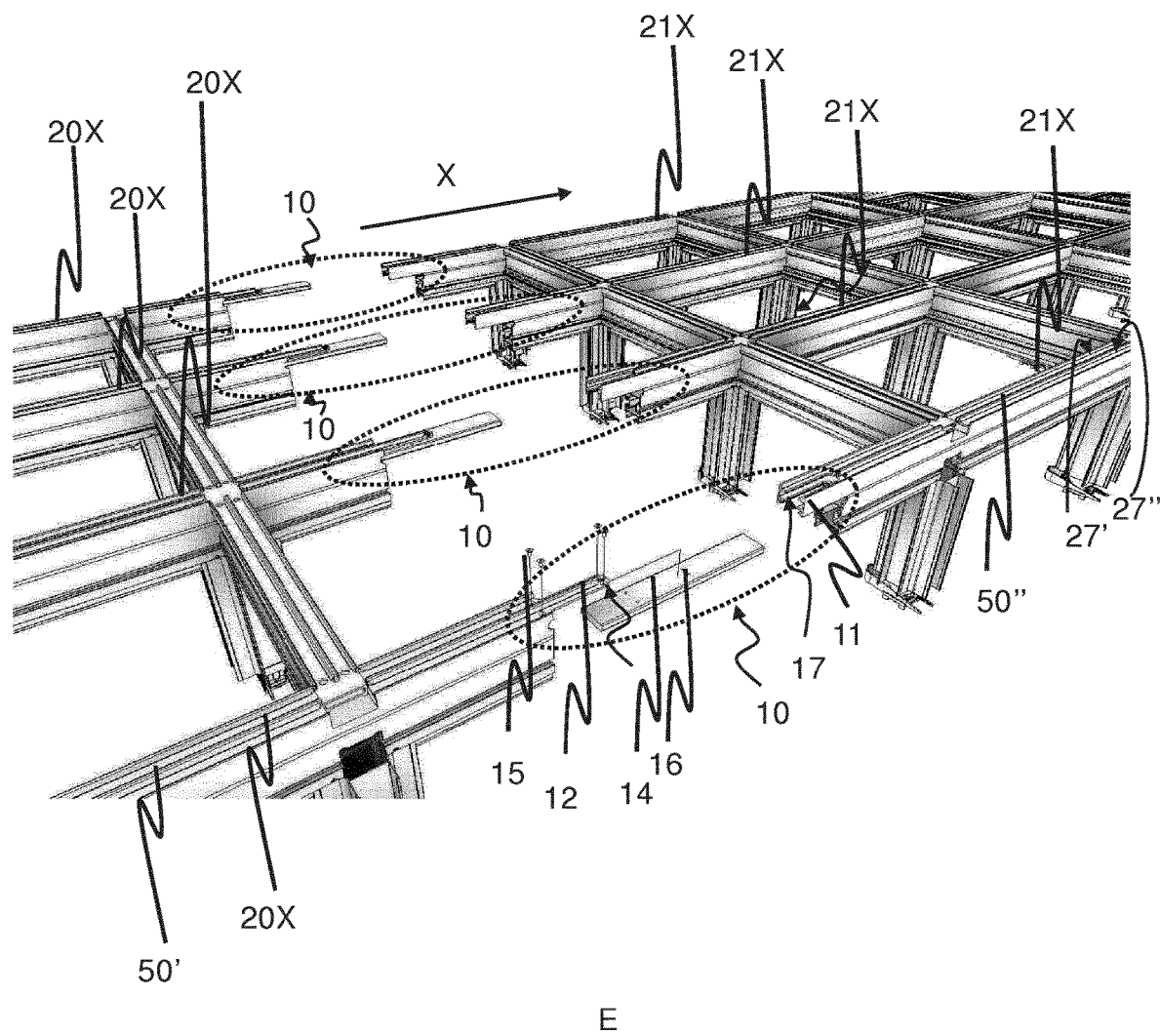

FIG. 4A is a side view of a delivery rail system 50, arranged below two storage grids 104', 104". The delivery rail system 50 originates from two delivery rails systems which have been connected using an expansion joint 10 according to an embodiment of the invention.

FIG. 4B is an enlarged view of section A in FIG. 4A showing a container handling vehicle 400 with wheel arrangement 401 on the delivery rail system 50. Similar to the connection of the storage grids 104', 104" described in relation to FIGS. 3A-3E, the two delivery rail systems 50', 50" are, in FIGS. 4B-4E, connected in the X direction of the rails, where a first set of rails 20X in X direction on delivery rail system with reference 50' is connected to a second set of rails 21X in the X direction of delivery rail system with reference 50" via the expansion joint 10 comprising the first rail element 12 and the second rail element 11. Identical expansion joints 10 are arranged between all of the first set of rails 20X which have a corresponding second set of rails 21X. In FIGS. 4B-4E there is a total of four expansion joints 10 connecting a total of four first sets of rails 20X, each with a dedicated second set of rails 21X. First and second rail elements 12, 11 are connected at opposite sides of the expansion joints 10 between the expansion joint 10 and the respective regions to be connected (in the disclosed embodiment: first and second sets of rails 20X, 21X). This number this is by way of example only—it provides three lanes for the vehicles to travel along—two or more lanes will reduce problems if a vehicle breaks down (single point failure) due to the grid arrangement. At least three lanes may be preferred in terms of flexibility for routing while not occupying too much space. However, it could be more.

FIG. 4C is an enlarged view of the delivery rail system of FIG. 4B.

FIG. 4D is a top side view of the expansion joint of FIG. 4C.

FIG. 4E is an exploded view of the expansion joint 10 disclosed in FIGS. 4A-4D used in the connection between the first and second sets of rails 20X, 21X in the X direction. The expansion joint 10 comprises a first rail element 12, in this embodiment a male protruding part connectable to the first set of rails 20X, and a second rail element 11, in this embodiment a female receiving part, connectable to the second set of rails 20X. The first rail element 12 extends in an axial direction equal to the direction of the first set of rails 20X, and the second rail element 11 comprises a receiving part extending in an opposite axial direction relative the first rail element 12. In FIG. 4E the expansion joint 10 further comprises an intermediate connection element 14. The intermediate connection element 14 is shown as a slide connection and is adapted to be connected below the first rail element 12 using suitable fastening means such as screw, pin or bolt 15 through vertical hole(s) 16 in the intermediate connection element 14. The second set of delivery rails 50' is, below the second rail element 11, provided with a recess for receiving the intermediate connection element 14 when the first and second sets of rails 50',50" are connected. When connected, the first rail element 12 and the second rail element 11 at least partly overlap in a direction perpendicular to the axial direction and forms part of a rail system on which container handling vehicles 300, 400 may travel. When connected, the first rail element 12, i.e. the male part, is allowed to move in an axial direction relative the second rail element 11 in that the protruding part 12 of the first rail element is received in the recess 17 in the second rail element 11, thereby forming a continuous drive track in the axial direction between the first set of delivery rails 50' and the second set of delivery rails 50". Furthermore, when connected, the axial flexibility of the expansion joint 10 allows for some relative movement between the rails in the first set of rails 50' and the second set of rails 50", e.g. +−40 mm, +−15 mm, or more or less. Non-continuous drive tracks are not acceptable for the container handling vehicles. Any non-continuous rails in the axial direction may lead to instable container handling vehicles and/or derailing.

Figure 5:
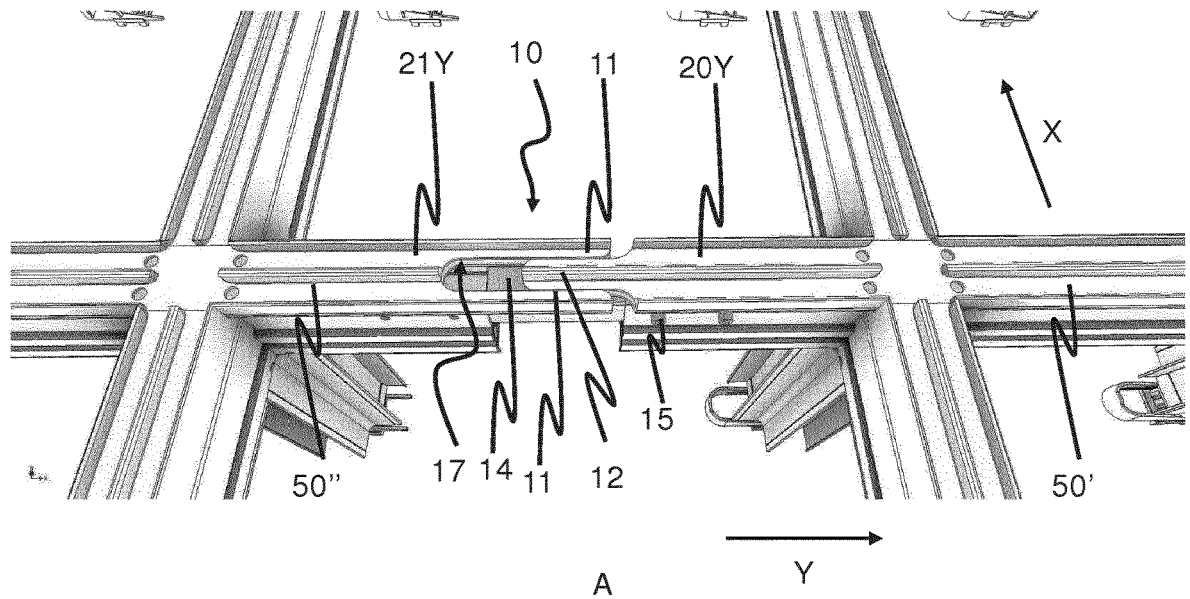
FIG. 5A is an example an expansion joint in the Y direction of the rails comprising a slide connection.
FIGS. 5B and 5C are exploded views of the expansion joint in FIG. 5A in the Y direction of the rails, comprising a slide connection, where
FIG. 5D is a close view of an expansion joint comprising a slide connection in the Y direction of the rails and showing the Y direction wheels of a container handling vehicle about to pass the slide connection.
Figure 5:
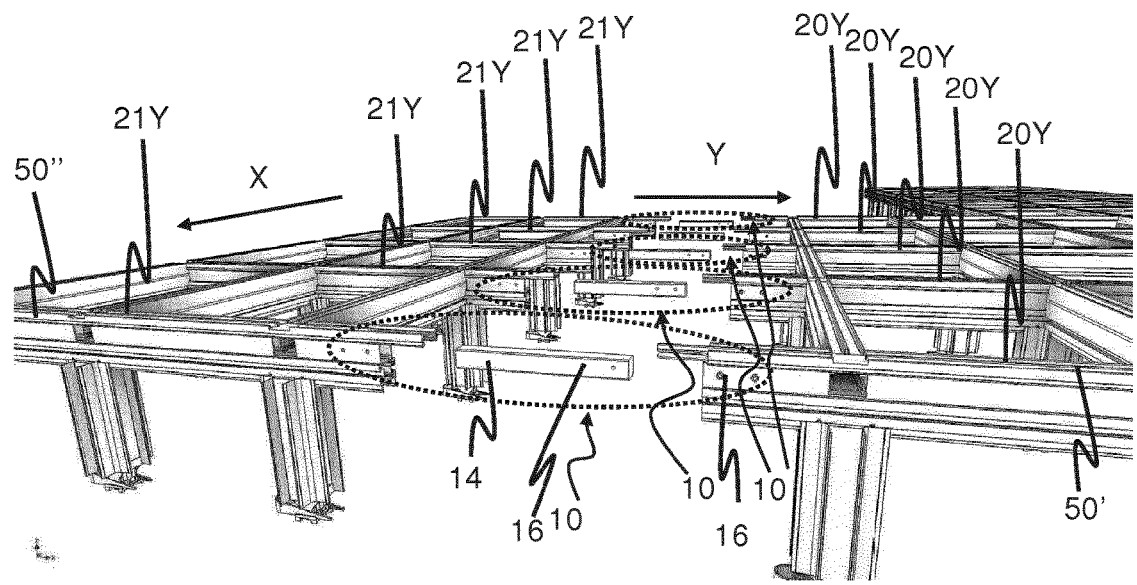
Figure 5:
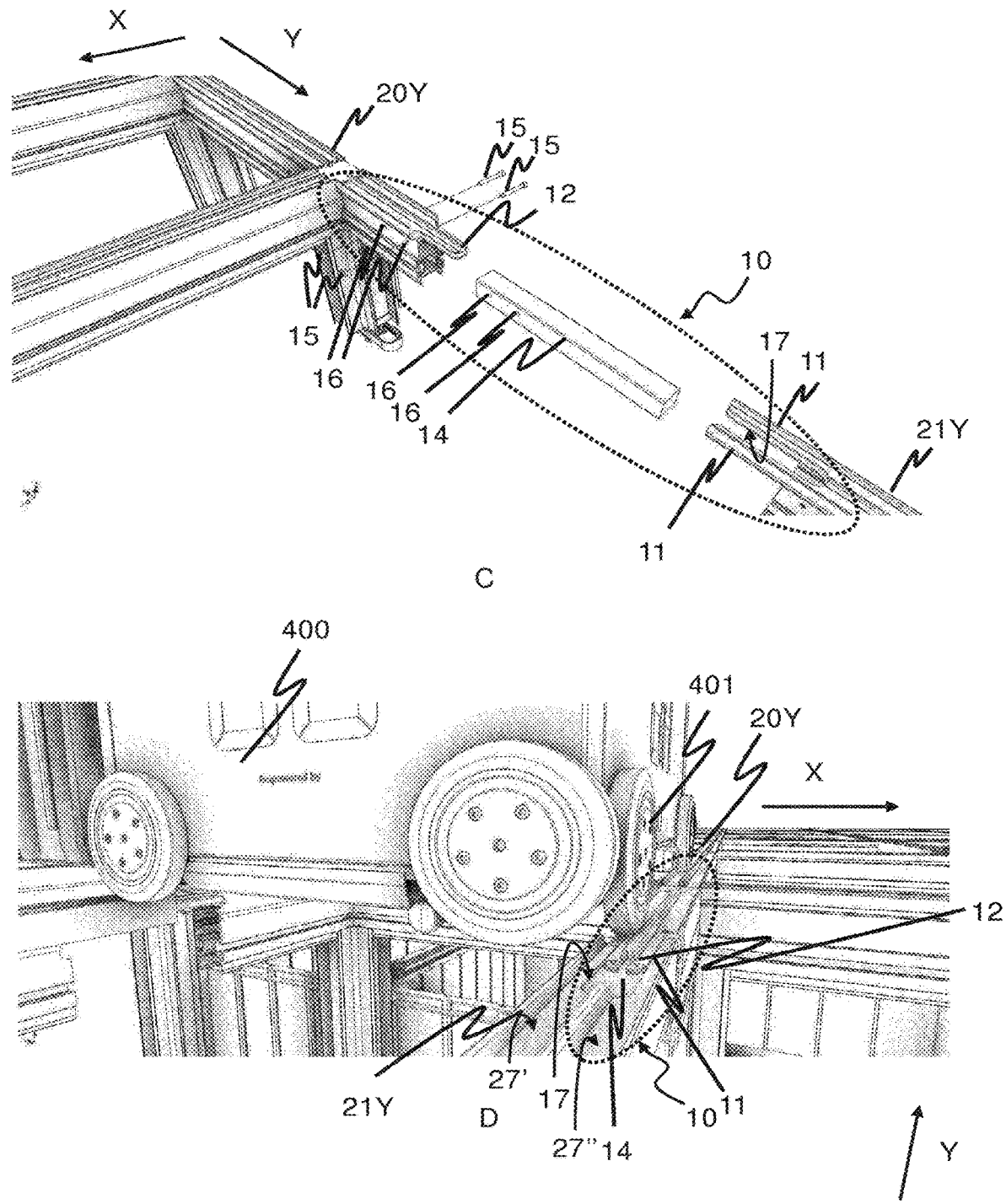

FIG. 5A is an example of an expansion joint in the Y direction between regions in a rail-based storage system exemplified as a first set of delivery rails 50' and a second set of delivery rails 50". The expansion joint 10 comprises a slide connection.

FIGS. 5B and 5C are exploded views of the expansion joint 10 in FIG. 5A in the Y direction of the first and second sets of delivery rails 50', 50", comprising a slide connection, where FIG. 5B is a side view and FIG. 5C is a top side view. The expansion joint 10 of FIGS. 5A-5C have almost all features in common with the expansion joint 10 described above in relation to FIG. 4E and will not be repeated, except for the intermediate connection element 14 which are provided with hole(s) 16 on its sidewalls instead of vertical holes. Consequently, the first set of rails 50' also have corresponding hole(s) 16 for receiving fastening means (see FIG. 5A). This is due to the different construction of the rails running in the Y direction vs. the rails running in the X direction.

FIG. 5D is a close view of an expansion joint 10 comprising a slide connection in the Y direction of the rails and showing the Y direction wheels 401 of a container handling vehicle 400 about to pass the expansion joint 10. As is clear from the Figure, the complementary shape of the recess 17 in the second rail element 11 and the protruding part of the first rail element 12 ensure a continuous drive track for the wheels of the container handling vehicle in that the protruding part and the recess 17 overlap in a direction perpendicular to the axial direction of the Y rails. In other words, the parts of the first and second rail elements 12, 11 that are arranged side-by-side each other in the transition form part of a continuous drive track(s) in the junction area where they overlap.

Figure 6:
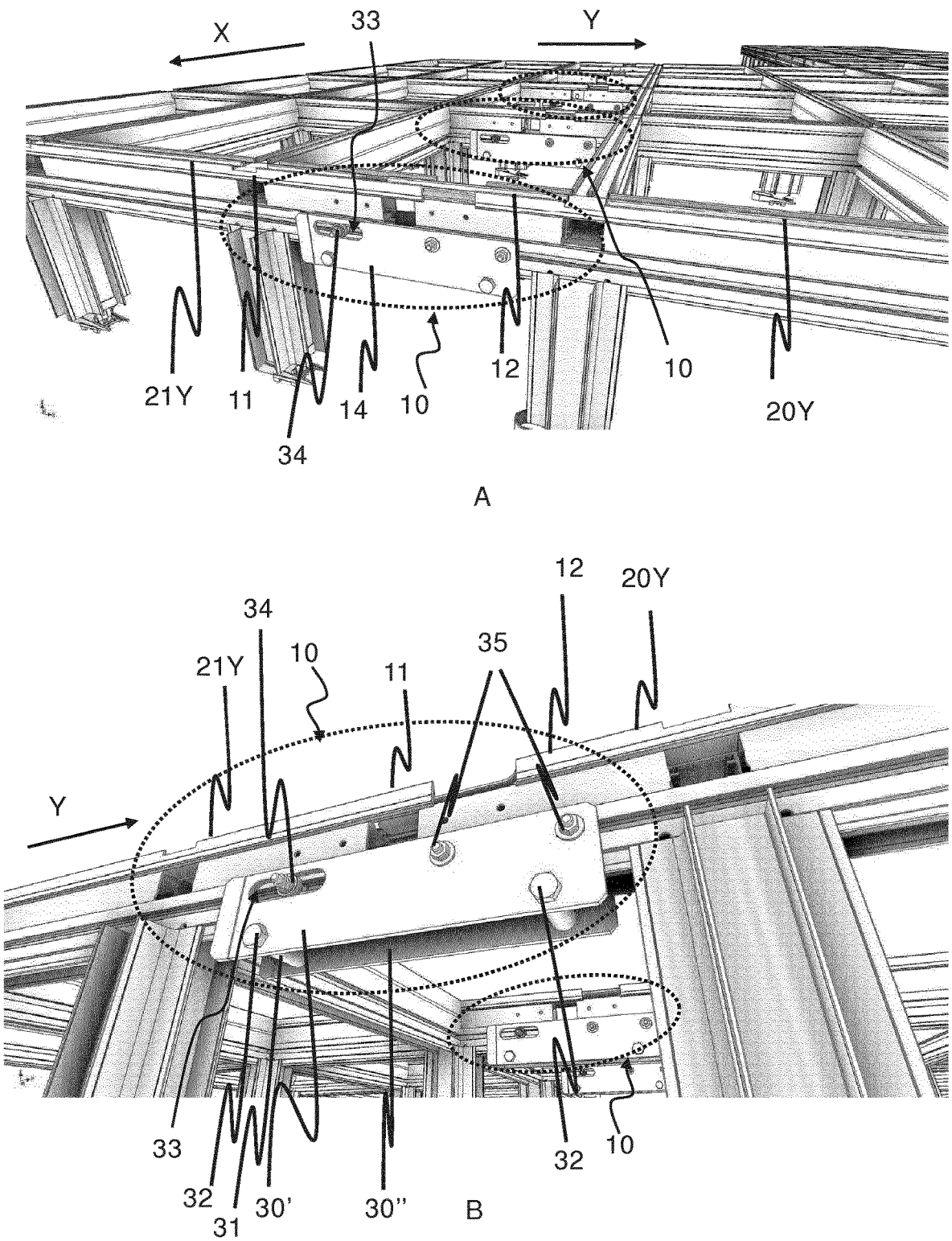
FIG. 6A is an example an expansion joint in the Y direction of the rails comprising a roller-based connection.
FIG. 6B is a view from below of FIG. 6A.
FIG. 6C is an exploded view of the expansion joint of FIGS. 6A and B comprising a roller-based connection, showing the components of one of the expansion joints between two rail systems in a Y direction of the rails.
Figure 6:
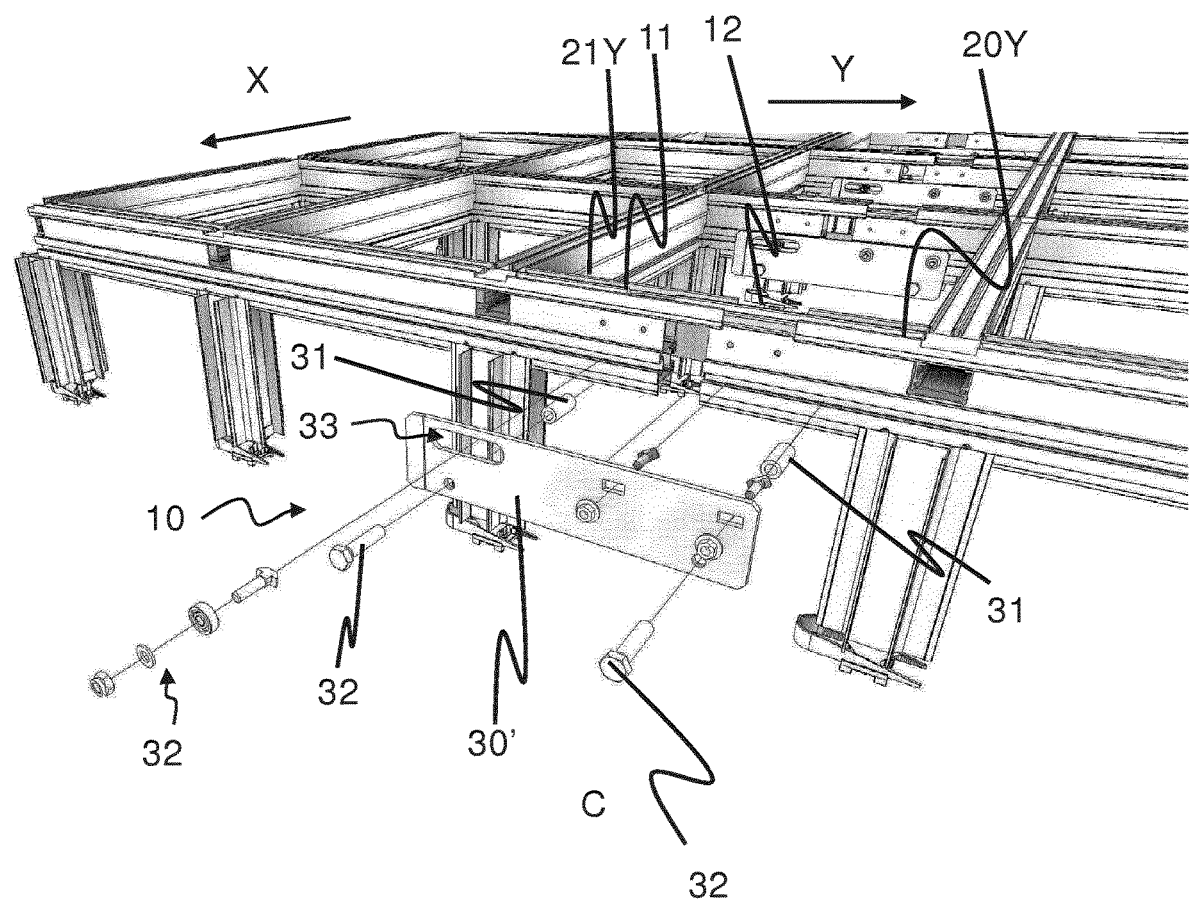

FIG. 6A is an example an expansion joint 10 in the Y direction of the rails comprising a roller-based connection. FIG. 6B is a view from below of FIG. 6A. FIG. 6C is an exploded view of the expansion joint 10 of FIGS. 6A and B comprising a roller-based connection, showing the components of one of the expansion joints 10 between a first rail system 20Y and a second rail system 21Y, in a Y direction. The expansion joint 10 comprises a first rail element 12, in this embodiment a male part connectable to the first set of rails 20Y, and a second rail element 11, in this embodiment a female part, connectable to the second set of rails 21Y. The first rail element 12 extends in an axial direction equal to the direction of the first set of rails 20Y, and the second rail element 11 comprises a receiving part extending in an opposite axial direction relative the first rail element 12. The expansion joint 10 further comprises an intermediate connection element 14. The intermediate connection element 14 is shown as a roller-based connection 14. The roller-based connection 14 comprises two brackets 30', 30' connected on each side of the first set of rails 20Y and connected to each other using suitable fastening means such as screw and/or bolt 32. In order to secure that the brackets 30', 30" are arranged in pre-defined distance from each other, a fixed distance element 31 can be arranged in between the two brackets 30', 30". Furthermore, as disclosed in FIG. 6B, two screws 35 are connected to the first set of rails 20Y. Each bracket 30', 30" is further provided with a recess 33 (only one recess shown in FIG. 6B). Rollers 34 (only one shown in FIGS. 6A, 6B) are connected to the second set of rails 21Y and are provided to move inside respective recesses 33 in the horizontal plane, i.e. in the axial direction of the drive tracks. The recess 33 and roller 34 lock the first set of rails 20Y relative the second set of rails 21Y vertically (i.e. in the Z direction) and in the X direction, but allows translational relative movement between the first set of rails 20Y relative the second set of rails 21Y in the Y direction. When connected, the axial flexibility of the expansion joint 10 allows for some relative movement between the rails in the first set of rails 20Y and the second set of rails 21Y, e.g. +−40 mm, +−15 mm, or more or less. Furthermore, when connected, the first rail element 12, i.e. the male part, is allowed to move in an axial direction relative the second rail element 11 in that the protruding part 12 of the first rail element is received in the recess 17 in the second rail element 11, thereby forming a continuous drive track in the axial direction between the first set of rails 20Y and the second set of rails 21Y.

Figure 7:
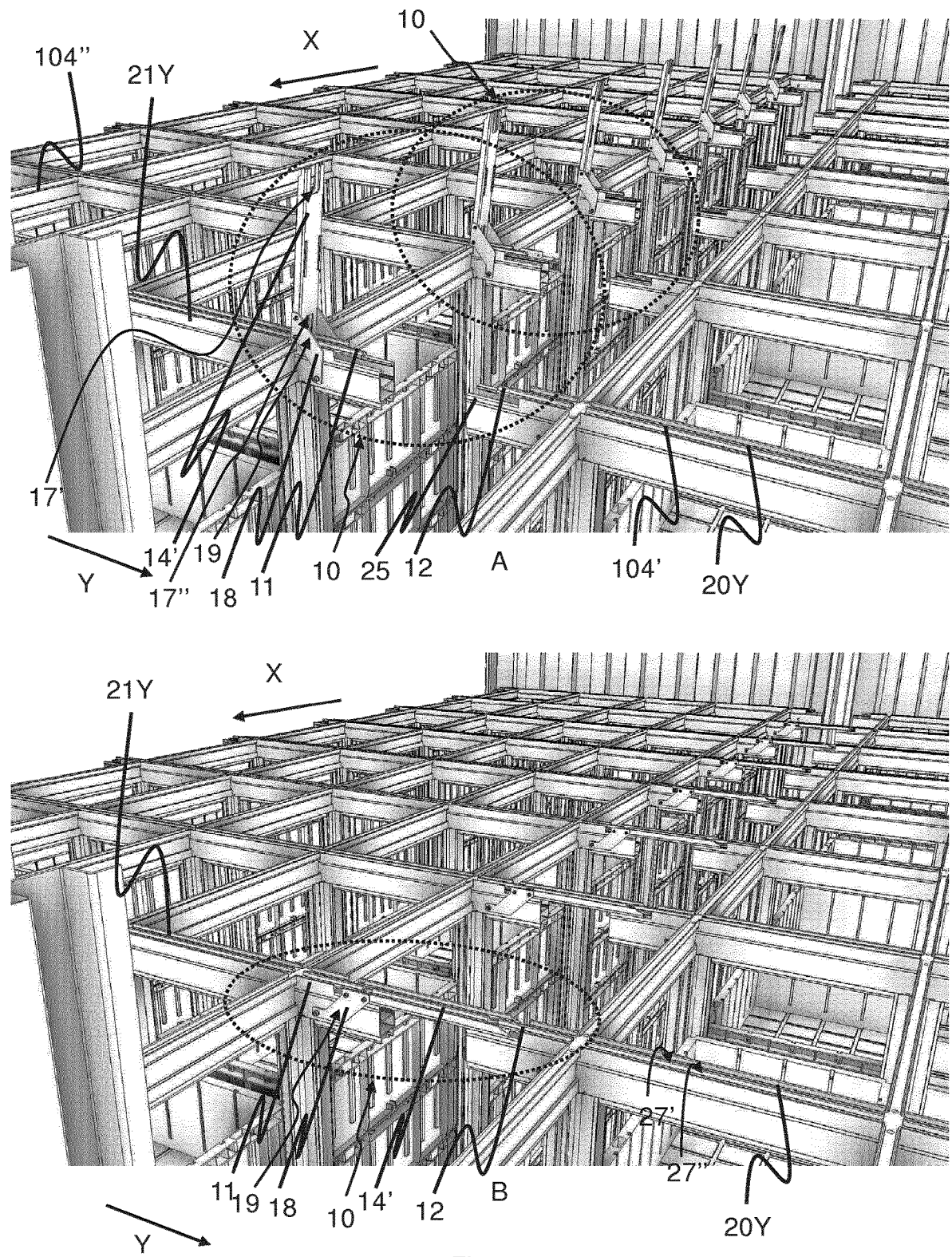
FIG. 7A is an example of an expansion joint comprising a pivot connection for connection to the first set of rails or the second set of rails, showing the expansion joint in a non-connected position.
FIG. 7B is an example of the expansion joint in FIG. 7A comprising a pivot connection connectable to the first set of rails or the second set of rails, showing the expansion joint in a connected position.
FIG. 7C is a top-view of the expansion joint of FIGS. 7A and 7B in a connected position.
Figure 7:
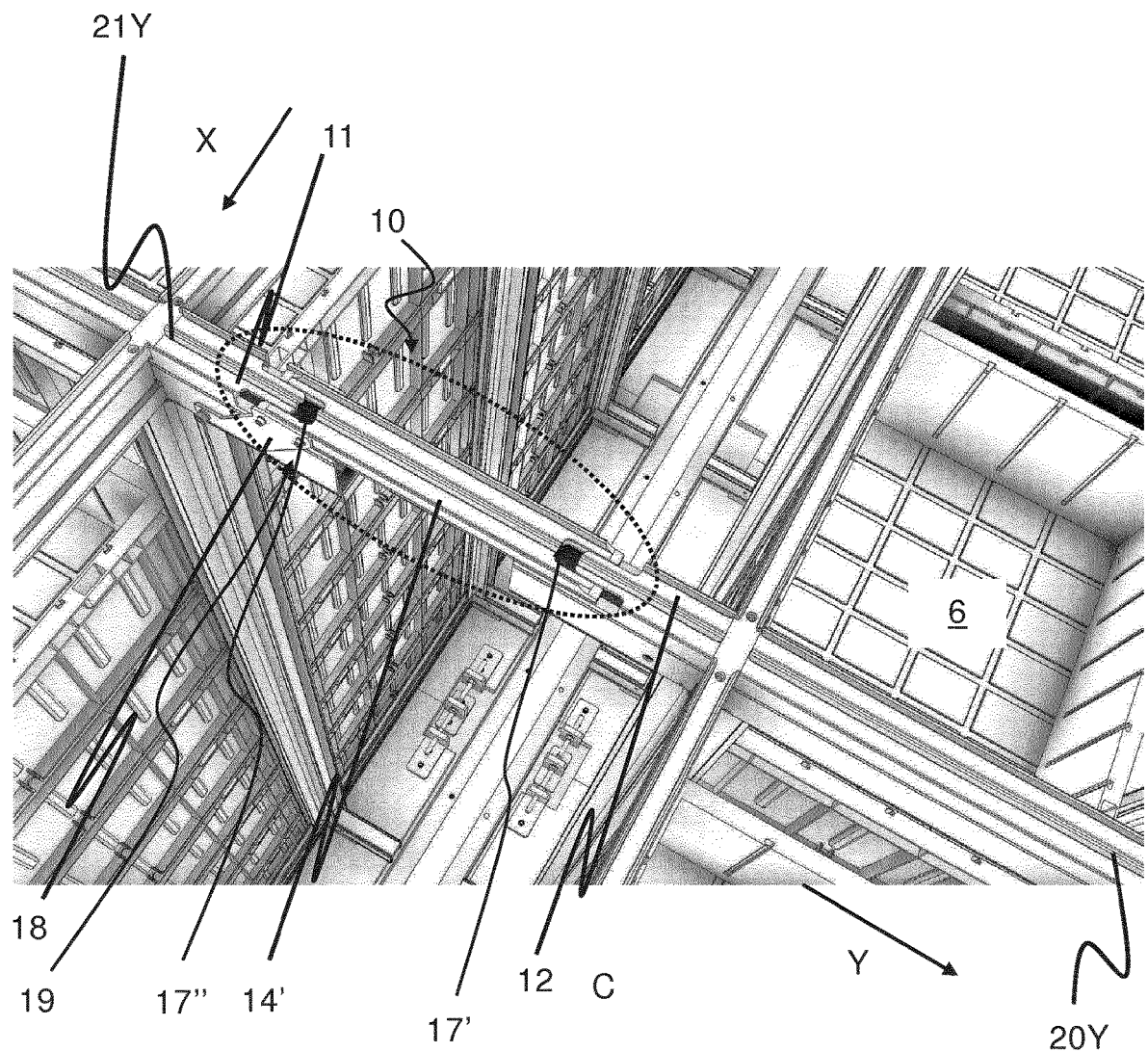

FIG. 7A is an example of an expansion joint 10 comprising a link 14' connected to the second rail element 11 (and the second set of rails 21Y) via a pivot connection arrangement 19. The pivot connection arrangement 19 is connected to the second set of rails 21Y and the link 14' via suitable fastening means (e.g. pivoting bracket 18 fastened by screw, bolts, pins etc.) known to the skilled person.

In FIG. 7A it is shown that the pivot connection arrangement 19 and the link 14' are pivoted in an upward direction relative the second set of rails 21Y. In FIG. 7A the first set of rails 20Y and the second set of rails 21Y are not connected, i.e. the expansion joint 10 is in a non-connected position. Alternatively, the pivot connection arrangement 19 can be pivoted to rest in a downward position and to be pivoted upwardly for connection with the first set of rails 20Y.

Although the pivot connection arrangement 19 is disclosed connected to the second rail element 11 (and thereby to the second set of rails 21Y), it is clear that the pivot connection arrangement 19 (and link 14') can be connected to the first rail element 12 (and thereby to the first set of rails 20Y) instead.

As disclosed in FIGS. 7A-7C, the link 14', which link 14' can be considered to form part of the second rail element 11 in the solution disclosed in FIGS. 7A-7C, are formed with a receiving part, i.e. a recess 17', on the end which is to be connected to the first rail element 12. This recess 17', i.e. female part, and complementary first rail element 12, i.e. male protruding part, are formed in a similar manner as discussed above in relation to FIGS. 4E and 5A. In addition, the end of the link 14' closest to the second rail element 11 can be (as disclosed in FIGS. 7A-7C) formed with a similar recess 17" to provide some flexibility in the connection between the link 14' and the second rail element 11 (and thereby the second set of rails 21Y).

The cooperation between the link 14' and the first set of rails 20Y may, when the link 14' is arranged mainly horizontally connecting the first set of rails 20Y and the second set of rails 21Y, be such that parts of the link 14' rests on a surface 25 on the first rail element 12. The surface 25 is preferably substantially horizontal such that the expansion joint 10 provides substantially flush drive tracks between the first set of rails 20Y and the second set of rails 21Y for the container handling vehicles 200, 300, 400.

FIG. 7B is an example of the expansion joint 10 in FIG. 7A, showing the expansion joint 10 in a connected position where the first and second set of rails 20Y, 21Y are connected.

FIG. 7C is a top-view of the expansion joint 10 of FIGS. 7A and 7B in a connected position. In FIG. 7C, the recesses 17', 17" in the link 14' and complementary parts of the first and second rail elements 11, 12 are shown in more detail. The male part of the first rail element 12 extends approximately halfway into the recess 17' of the link 14' allowing some relative axial movement between the first set of rails 20Y and the second set of rails 21Y when connected.

The first rail element 12 can be the male part or the second rail element 11 can be the male part, and the first rail element 12 can be the female part or the second rail element 11 can be the female part. In this embodiment there are no separate intermediate element 14, i.e. the expansion joint 10 is simply pivoted between connected position and non-connected position by pivoting the link 14' between resting position (i.e. non-connected position) and active position (i.e. connected position).

The rail systems in FIG. 7C comprises a single track in the X direction and a double track in the Y direction, however this is only one of the options, as there may be either only single rails or only double rails both in the X and Y direction.

In the preceding description, various aspects of the expansion joint and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. For example, rails sensors in the container handling vehicles normally emit light towards the side which are reflected back by the sidewalls in the rails. When a container handling vehicle enters a XY cross, there are no sidewalls, thus the light is not reflected back to the sensor. However, if the expander joint has a part without side walls, false signals can be the result. Software in the vehicle can correct for any such false light to the rail/track sensor in the container handling vehicles when driving pass an expander joint, possibly in connection with measurement of cell size (the size of the cells with expander joints are not fixed as is the fixed grid cells). The overall control system, which control system keeps track of all vehicles in the system, knows when the vehicle is about to enter a cell with an expansion joint. When a vehicle enters a cell with an expansion joint, the overall control system may then either ignore the signal representing the false light at the expansion joint or, turn off the sensor in the vehicle when passing the expansion joint. Alternatively, the risk of such false lights may be reduced by arranging a slide sidewall at the expansion joint which moves together with the expansion joint or which is of such a size that it covers the expansion joint also in a maximum extended position.

Figure 8:
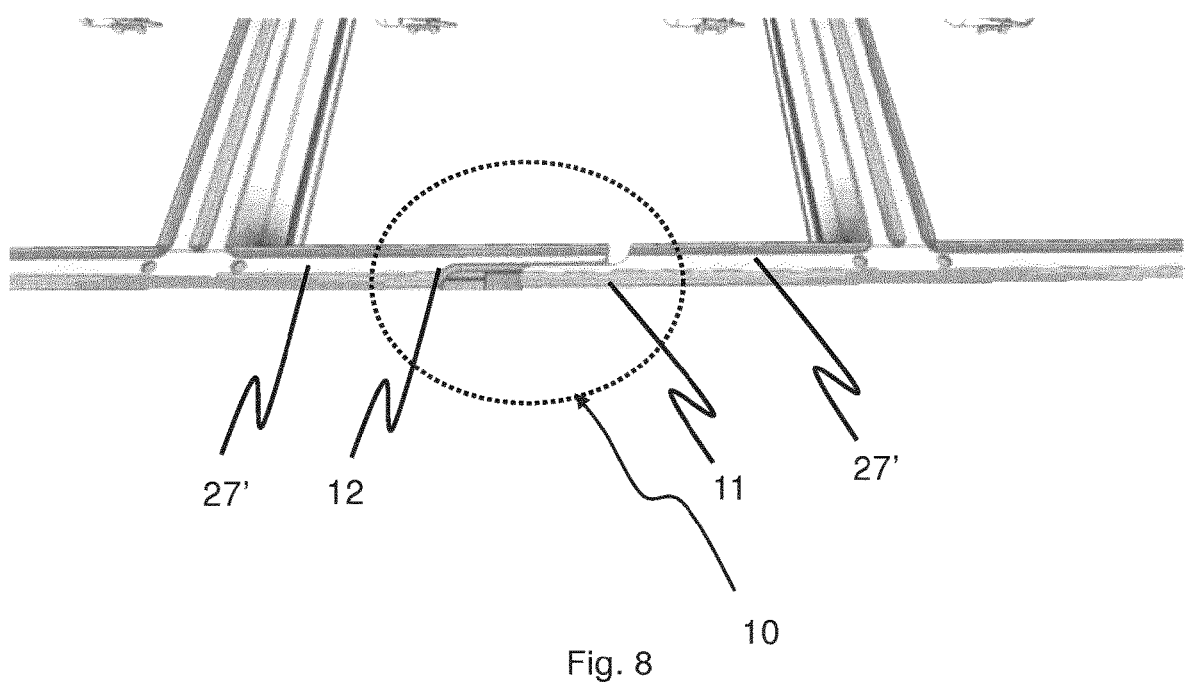
FIG. 8 is an example of an expansion joint used in connection of single tracks.

FIG. 8 is an example of an expansion joint used in connection of single tracks. In the junction area of the expansion joint for single tracks, it is formed a S-shape, which can be seen in FIG. 8. This is due to that both the first rail element 12 and the second rail element 11 are S-shaped. The divider line between the first rail element 12 and the second rail element 11 is preferably along the centre line of the track 27'. If the rail is a single-track rail, then presumably the junction area would take the S-shape, but usually it will be a double-track rail and so these can be arranged as mirrored profiles to create the male part and the female part. The junction area as shown in FIG. 8, with the S-shape from one track leading through to an S-shape across another which is arranged in a similar manner, so that the slots in the tracks 27' are spread along the track 27'. The gap in the middle between the first and second rail elements 12, 11, would not need to be as big as shown, corresponding to the size of the gap at the sides. If it is important for lateral stability to provide a male shape and a female shape, then the tracks on the opposite side of the grid cell could have mirrored profiles to provide that same interlocking effect.

The disclosed figures disclose a solution to the problems mentioned in relation to prior art, i.e. an expansion joint which simplifies the connection of two rail systems. In addition, the disclosed solution provides a connection which solves, or at least mitigates, issues relating to expansion and/or contraction of rails, and in particular rails of significant length subject to large temperature differences with the risk of expansion and contraction as the result.

Various modifications and variations of the illustrative embodiments, as well as other embodiments of the system, which are apparent to persons skilled in the art to which the disclosed subject matter pertains, are deemed to lie within the scope of the present invention as defined in the claims.

REFERENCE NUMERALS

1 Storage and retrieval system
10 Expansion joint
11 Second rail element/Female part
12 First rail element/Male part
14 Intermediate connection element/roller-based connection
14' Link
15 Fastening means/pin/screw/bolt
16 Hole(s)
17, 17', 17" Recess in second rail element/recess in intermediate connection element or link
18 bracket
19 Pivot connection arrangement
20X First set of rails in X direction
20Y First set of rails in Y direction
21X Second set of rails in X direction
21Y Second set of rails in Y direction
22 Space
25 Surface first rail element
27', 27" Tracks in profiled upper surface
30', 30" Bracket
31 Fixed Distance element
32 Screw/bolt
33 recess
34 Roller
35 screw
50, 50', 50" Delivery rail system
P Horizontal plane
100 Framework structure
102 Upright members of framework structure 103 Horizontal members of framework structure
104, 104', 104" Storage grid/three-dimensional grid
105 Storage column
106, 106' Storage container
107 Stack
108 Rail system/Container handling vehicle rail system
110 First set of parallel rails in first direction (X)
110a First neighboring rail of first set
110b Second neighboring rail of first set
111 Second set of parallel rails in second direction (Y)
111a First neighboring rail of second set
111b Second neighboring rail of second set
115 Grid opening/Container handling vehicle grid opening
119 Delivery column
120 Delivery column
122 Grid cell/Container handling vehicle grid cell
200 First container handling vehicle
201 Wheel arrangement
300 Second container handling vehicle
301 Wheel arrangement
400 Third container handling vehicle
401 Wheel arrangement
X First direction
Y Second direction
P Horizontal plane of rail system
Wo Width of container handling vehicle grid opening
Wc Width of container handling vehicle grid cell
Lo Length of container handling vehicle grid opening
Lc Length of container handling vehicle grid cell

The invention claimed is:

1. An expansion joint for connecting regions of a rail-based grid storage system, the expansion joint comprising:
a first rail element and a second rail element, the rail elements being elongate and configured to slide relative to one another in a longitudinal direction in a junction area where they overlap,
the expansion joint having a profiled upper surface that defines one or more tracks for supporting container handling vehicles, the or each track extending from the first rail element through the junction area to the second rail element, wherein in the junction area, each rail element provides a portion of the or each track of the profiled upper surface so that there is a transition extending along the expansion joint from the first rail element to the second rail element for the or each track,
wherein the expansion joint comprises a first and a second track, and wherein the portions of the tracks each form dividing lines running along a center of the first and second tracks, respectively, and
wherein the first or second rail element of the expansion joint comprises a pivot connection arrangement forming a link, the link being able to span a gap between the first and second rail elements, the pivot connection arrangement allowing the link to be pivoted between a non-connected position where the first and second rail elements of the expansion joint are not connected together and a connected position where the first and second rail elements of the expansion joint are connected together by the link and forms the junction area between the first or second rail element and the link.

2. The expansion joint according to claim 1, wherein the first rail element comprises a protruding male part and the second rail element comprises a receiving female part comprising a recess.

3. The expansion joint according to claim 1, wherein the junction area defines a dividing line between the first rail element and the second rail element that runs along a center of the or each track where the first and second rail elements overlap.

4. The expansion joint according to claim 1, wherein the expansion joint further comprises a guide arrangement provided below the one or more tracks to support ends of the first and second rail elements and guide relative longitudinal movement thereof as the portions of the one or more tracks slide relative to each other in the junction area.

5. The expansion joint according to claim 4, wherein the guide arrangement comprises a slide connection.

6. The expansion joint according to claim 4, wherein the guide arrangement comprises a roller-based connection which is arranged to prevent movement in a direction perpendicular to the longitudinal direction.

7. An automatic storage and retrieval system comprising first and second regions a rail-based grid storage system and/or a delivery rail system, wherein the system comprises one or more expansion joints according to claim 1 and each of the first and second regions have rails with a profiled upper surface that define one or more tracks of the same gauge and profile as the one or more tracks in the expansion joints, the expansion joints being arranged as one or more connections between the first and second regions.

8. The automatic storage and retrieval system according to claim 7, wherein the first and second regions are two regions of a rail-based grid storage system or two regions of a delivery rail system.

9. The automatic storage and retrieval system according to claim 7, wherein the first and second regions of a rail-based grid storage system and/or a delivery rail system comprise a grid arrangement of rails defining a plurality of grid cells.

10. A method of connecting regions of a rail-based grid storage system and/or delivery rail system using one or more expansion joints according to claim 1, each of the regions having rails with a profiled upper surface that defines one or more tracks of the same gauge and profile as the one or more tracks in the expansion joints, wherein the method comprises the steps of:
arranging the regions with a predetermined separation, and
connecting the regions together using one or more of the expansion joints, thereby forming a continuous network of rails linking one end of a first region, via the expansion joint, to an opposite end of a second region.

11. The method according to claim 10, further comprising, before connecting the first and second regions, a step of:
levelling the first and second regions such that the profiled upper surfaces of the first and second regions are on the same elevation.

12. The method according to claim 10, wherein the first and second regions are regions of a rail-based storage grid system or a delivery rail system.

13. The method according to claim 10, wherein the expansion joints allow up to ±40 mm of relative movement between the regions of the rail-based grid storage system and/or delivery rail system to accommodate changes in ambient temperature.

* * * * *